(12) United States Patent
Chen et al.

(10) Patent No.: US 7,450,919 B1
(45) Date of Patent: Nov. 11, 2008

(54) I/Q MISMATCH CORRECTION USING TRANSMITTER LEAKAGE AND GAIN MODULATION

(75) Inventors: Jesse E. Chen, Sunnyvale, CA (US); Pengfei Zhang, Shanghai (CN)

(73) Assignee: RF Micro Devices, Inc., Greensboro, NC (US)

( * ) Notice: Subject to any disclaimer, the term of this patent is extended or adjusted under 35 U.S.C. 154(b) by 465 days.

(21) Appl. No.: 11/349,417

(22) Filed: Feb. 7, 2006

(51) Int. Cl.
*H04B 1/10* (2006.01)
(52) U.S. Cl. .............. 455/226.1; 455/296; 455/324
(58) Field of Classification Search ............ 455/67.11, 455/67.13, 67.14, 226.1, 296, 311, 312, 324
See application file for complete search history.

(56) References Cited

U.S. PATENT DOCUMENTS 7,123,896 B2 * 10/2006 Chiu ..................... 455/313
7,346,313 B2 * 3/2008 Cafarella ............... 455/67.11
2007/0123188 A1 * 5/2007 Mo et al. ................. 455/302

* cited by examiner

*Primary Examiner*—Nguyen Vo
(74) *Attorney, Agent, or Firm*—Withrow & Terranova, P.L.L.C.

(57) ABSTRACT

A system and method are provided for compensating for an I/Q mismatch of a receiver in a mobile terminal. In general, the receiver and a transmitter of the mobile terminal are formed on a single substrate. A transmit signal is transmitted via the transmitter. Due to leakage through the substrate, the transmit signal is provided to one or more points in the receiver. One of these points is an input of the amplifier circuitry. A gain of the amplifier circuitry is modulated during reception of the transmit signal such that an amplified signal provided by the amplifier circuitry is offset from the carrier frequency of the transmit signal by a known frequency offset. The amplified signal is downconverted to provide a quadrature output signal. Processing circuitry processes frequency components of the quadrature output signal corresponding to the known frequency offset to determine the I/Q mismatch of the receiver.

20 Claims, 3 Drawing Sheets

I/Q MISMATCH CORRECTION USING TRANSMITTER LEAKAGE AND GAIN MODULATION

FIELD OF THE INVENTION

The present invention relates to direct conversion transceivers, and more particularly to baseband correction of an I/Q mismatch of a direct conversion receiver.

BACKGROUND OF THE INVENTION

Most direct conversion radio frequency receivers require baseband correction for a mismatch between the in-phase (I) and quadrature-phase (Q) paths, which is referred to as I/Q mismatch. The receiver downconverts a received signal from a radio frequency signal to a quadrature baseband signal. More specifically, the receiver includes a first mixer that mixes the radio frequency signal with an in-phase component of a local oscillator signal to downconvert the radio frequency signal to an in-phase component of the quadrature baseband signal. Similarly, the receiver includes a second mixer that mixes the radio frequency signal with a quadrature-phase component of the local oscillator signal to downconvert the radio frequency signal to a quadrature-phase component of the quadrature baseband signal.

However, the gain of the first mixer may not be matched to the gain of the second mixer. As a result, a gain error is introduced into the quadrature baseband signal. In addition, the in-phase and the quadrature-phase components of the local oscillator signal used by the mixers for downconversion may not be ninety degrees out-of-phase. Thus, a phase error, or quadrature error, is introduced into the quadrature baseband signal. Combined, the gain and quadrature errors form an I/Q mismatch of the receiver. It is desirable to correct the I/Q mismatch of the receiver at baseband in order to provide improved performance.

Generally, baseband correction of the I/Q mismatch of the receiver is performed based on a 2×2 distortion matrix defining a relationship between the actual I and Q components having been distorted by the I/Q mismatch of receiver and the ideal I and Q components. However, the distortion matrix is not easily calibrated.

Thus, there remains a need for a system and method for providing baseband correction of an I/Q mismatch of a direct conversion radio frequency receiver and more particularly for calibrating the distortion matrix used to compensate for the I/Q mismatch of the receiver.

SUMMARY OF THE INVENTION

The present invention provides a system and method for compensating for an I/Q mismatch of a receiver in a mobile terminal. In general, the receiver and a transmitter of the mobile terminal, or a portion thereof, are formed on a single substrate. Processing circuitry operates to transmit a transmit signal via the transmitter. Due to leakage through the substrate, the transmit signal is provided to one or more points in the receiver. One of these points is an input of the amplifier circuitry. The processing circuitry modulates a gain of the amplifier circuitry during reception of the transmit signal such that an amplified signal provided by the amplifier circuitry is offset from the carrier frequency of the transmit signal by a known frequency offset. As a result, the amplified signal is offset from the transmit signal that may enter the receiver at other undesired points in the receive path due to leakage through the substrate. The receiver operates to downconvert the amplified signal using a quadrature local oscillator signal to provide a quadrature output signal. The processing circuitry processes frequency components of the quadrature output signal corresponding to the known frequency offset to determine the I/Q mismatch of the receiver.

More specifically, the processing circuitry processes the quadrature output signal to determine Fourier coefficients for the frequency components corresponding to the known frequency offset. Using the Fourier coefficients and a known relationship between the Fourier coefficients and the I/Q mismatch, the I/Q mismatch of the receiver is determined. Thereafter, a correction matrix may be determined and used during reception of subsequent signals to post-distort the quadrature output signal to compensate for the I/Q mismatch of the receiver.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
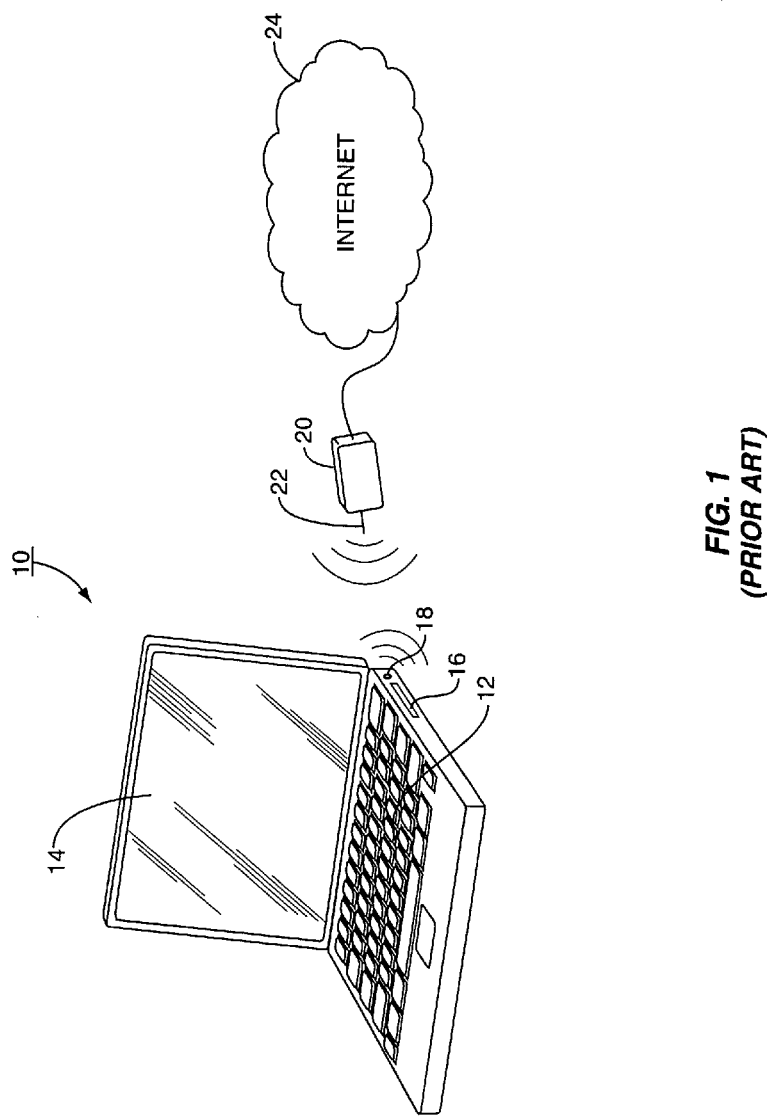
FIG. 1 illustrates a conventional laptop computer connected to the Internet via a connection according to the IEEE 802.11 standard.

The present invention is preferably incorporated in a mobile terminal, such as a laptop computer, personal digital assistant, wireless Local Area Network (LAN) device, or the like. Mobile terminals such as laptop computer 10 in FIG. 1 are becoming more prevalent with each passing day. The laptop computer 10 may have a keyboard 12, a display 14, a disk drive 16, and other input/output devices as is well understood. The laptop computer 10 includes an antenna 18 for communicating wirelessly with a modem 20 using such standards as any of the IEEE 802.11 standards. The modem 20 may be a cable modem or the like and may incorporate a hub (not shown) with an antenna 22 that receives the wireless signals from the laptop computer 10. The modem 20 connects to the Internet 24 as is well understood. By providing the laptop computer 10 with a wireless modem and antenna 18, the designers allow users of the laptop computer 10 to improve the mobility and versatility of the laptop computer 10.

Figure 2:
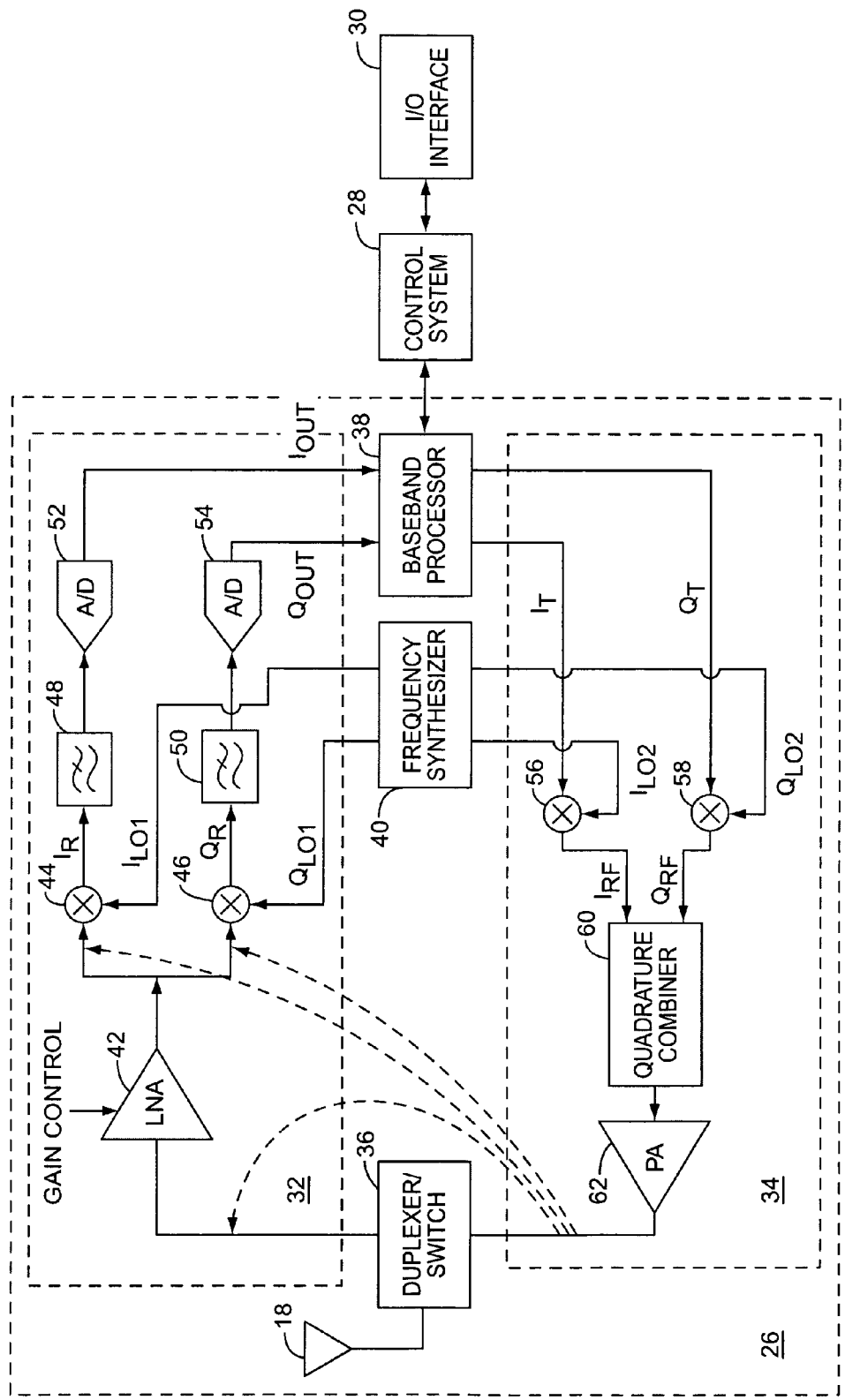
FIG. 2 illustrates a schematic diagram of a wireless modem according to one embodiment of the present invention.

FIG. 2 illustrates an exemplary wireless modem 26 including antenna 18 for use in the laptop computer 10 of FIG. 1. This embodiment is exemplary, and the wireless modem 26 may be incorporated into any device to provide wireless communication. In addition to the wireless modem 26, the laptop computer 10 includes a control system 28, which may be a microprocessor and associated operating system and the like as is well understood. The control system 28 is associated with an Input/Output (I/O) interface 30 to receive inputs from a user and generate outputs for the user. For example, the I/O interface 30 may cooperate with the keyboard 12 and the display 14 as is well understood.

The wireless modem 26 includes a receiver front end 32, a radio frequency transmitter 34, the antenna 18, a duplexer or switch 36, a baseband processor 38, and a frequency synthesizer 40. The receiver front end 32 receives information bearing radio frequency signals from one or more remote transmitters such as another wireless modem. A low noise amplifier (LNA) 42 amplifies the received signal. Mixers 44 and 46 receive the amplified signal from the LNA 42 and operate to downconvert the amplified signal from a radio frequency to baseband, thereby providing a quadrature receive signal ($I_R$, $Q_R$). Low-pass filters 48 and 50 filter the quadrature receive signal ($I_R$, $Q_R$) to remove high frequency components prior to digitization by analog-to-digital (A/D) converters 52 and 54.

More specifically, the mixer 44 mixes the amplified signal from the LNA 42 with an in-phase component ($I_{LO1}$) of a local oscillator signal ($I_{LO1}$, $Q_{LO1}$) provided by the frequency synthesizer 40, thereby providing the in-phase component ($I_R$) of the quadrature receive signal ($I_R$, $Q_R$). The mixer 46 mixes the amplified signal from the LNA 42 with a quadrature-phase component ($Q_{LO1}$) of the local oscillator signal ($I_{LO1}$, $Q_{LO1}$) to provide the quadrature-phase component ($Q_R$) of the quadrature receive signal ($I_R$, $Q_R$). The frequency of the local oscillator signal ($I_{LO1}$, $Q_{LO1}$) is essentially equal to a center frequency, or carrier frequency, of the received radio frequency signal such that the mixers 44 and 46 provide the quadrature receive signal ($I_R$, $Q_R$) at baseband. The quadrature receive signal ($I_R$, $Q_R$) is filtered by low-pass filters 48 and 50 and digitized by the A/D converters 52 and 54 to provide in-phase and quadrature-phase output signals ($I_{OUT}$ and $Q_{OUT}$). The in-phase and quadrature-phase output signals ($I_{OUT}$ and $Q_{OUT}$) are provided to the baseband processor 38.

The baseband processor 38 processes the in-phase and quadrature-phase output signals ($I_{OUT}$ and $Q_{OUT}$) to extract the information or data bits conveyed in the received signal. This processing typically comprises demodulation, decoding, and error correction operations. As such, the baseband processor 38 is generally implemented in an Application Specific Integrated Circuit (ASIC) or one or more digital signal processors (DSPs).

On the transmit side, the baseband processor 38 receives digitized data from the control system 28, which it may encode for transmission. After encoding the data from the control system 28, the baseband processor 38 modulates the encoded data according to a predetermined modulation scheme. In one embodiment, the modulation scheme is Orthogonal Frequency Division Multiplexing (OFDM), as defined in IEEE 802.11a/g. The baseband processor 38 then provides the modulated signal, hereafter referred to as a transmit signal ($I_T$, $Q_T$), to the radio frequency transmitter 34. Within the radio frequency transmitter 34, mixers 56 and 58 operate to upconvert the transmit signal ($I_T$, $Q_T$) from the baseband processor 38 to a carrier frequency. More specifically, the mixer 56 mixes an in-phase component ($I_T$) of the transmit signal ($I_T$, $Q_T$) with an in-phase component ($I_{LO2}$) of a local oscillator signal ($I_{LO2}$, $Q_{LO2}$) to provide an in-phase component ($I_{RF}$) of a radio frequency transmit signal ($I_{RF}$, $Q_{RF}$). The mixer 58 mixes a quadrature-phase component ($Q_T$) of the transmit signal ($I_T$, $Q_T$) with a quadrature-phase component ($Q_{LO2}$) of the local oscillator signal ($I_{LO2}$, $Q_{LO2}$) to provide a quadrature-phase component ($Q_{RF}$) of the radio frequency transmit signal ($I_{RF}$, $Q_{RF}$).

The in-phase component ($I_{RF}$) and the quadrature-phase component ($Q_{RF}$) of the radio frequency transmit signal ($I_{RF}$, $Q_{RF}$) are combined by a quadrature combiner 60 to provide a combined transmit signal. The combined transmit signal is amplified by power amplifier circuitry 62 to a level appropriate for transmission from the antenna 18. A gain of the power amplifier circuitry 62 may be controlled by the control system 28 via the baseband processor 38 or solely by the baseband processor 38.

Although the mixers 44 and 46 of the receiver front end 32 are typically designed to have the same characteristics, the gain of the mixer 44 may not be equal to the gain of the mixer 46, thereby resulting in a gain error. In addition, the in-phase component ($I_{LO1}$) and the quadrature-phase component ($Q_{LO1}$) of the local oscillator signal ($I_{LO1}$, $Q_{LO1}$) are ideally ninety degrees out-of-phase. However, there is typically a phase error, also called quadrature error, due to inherent errors of the frequency synthesizer 40 and differences in layout paths. Combined, the gain error and the quadrature error form an I/Q mismatch of the receiver front end 32.

The present invention provides a method of correcting the I/Q mismatch of the receiver front end 32 based on leakage of a radio frequency signal transmitted from the radio frequency transmitter 34 into the receiver front end 32. More specifically, the present invention provides a method of determining the I/Q mismatch of the receiver front end 32 and/or calibrating a correction matrix used to post-distort the quadrature output signal ($I_{OUT}$, $Q_{OUT}$) within the baseband processor 38 in order to compensate for the I/Q mismatch of the receiver front end 32.

The operation of the receiver front end 32 up to and including the A/D converters 52 and 54 may be generally defined by the following equations:

$$RF_{IN} = I_{IN} \cos(\omega_C t) - Q_{IN} \sin(\omega_C t);$$

$$I_{LO} = \left(1 + \frac{\varepsilon}{2}\right) \cdot 2 \cdot \cos\left(\omega_C \cdot t + \theta + \frac{\Delta\phi}{0}\right);$$

$$Q_{LO} = -\left(1 - \frac{\varepsilon}{2}\right) \cdot 2 \cdot \sin\left(\omega_C \cdot t + \theta - \frac{\Delta\phi}{0}\right);$$

where $RF_{IN}$ is the received radio frequency signal at the input of the LNA 42; $I_{IN}$ is the in-phase component of the transmitted signal; $Q_{IN}$ is the quadrature-phase component of the transmitted signal; $\omega_C$ is the carrier frequency of the received radio frequency signal; $I_{LO}$ is the in-phase component of the local oscillator signal ($I_{LO1}$, $Q_{LO1}$) provided to the mixer 44; $Q_{LO}$ is the quadrature-phase component of the local oscillator signal ($I_{LO1}$, $Q_{LO1}$) provided to the mixer 46, $\varepsilon$ is the gain error; $\Delta\phi$ is the quadrature error; and $\theta$ is the phase offset between the carrier frequency and the local oscillator signal ($I_{LO1}$, $Q_{LO1}$).

Let h(t) be the impulse response of the low pass filter and let ⊗ represent convolution. After low-pass filtering, the in-phase and quadrature-phase output signals ($I_{OUT}$ and $Q_{OUT}$) may be defined by the following equations:

$$I_{OUT} = h(t) \otimes (RF_{IN} \cdot I_{LO})$$

$$I_{OUT} = \left(1 + \frac{\varepsilon}{2}\right) \cdot \cos\left(\frac{\Delta\phi}{2} + \theta\right) \cdot I_{IN} + \left(1 + \frac{\varepsilon}{2}\right) \cdot \sin\left(\frac{\Delta\phi}{2} + \theta\right) \cdot Q_{IN};$$

and $$Q_{OUT} = h(t) \otimes (RF_{IN} \cdot Q_{LO})$$

$$Q_{OUT} = \left(1 - \frac{\varepsilon}{2}\right) \cdot \sin\left(\frac{\Delta\phi}{2} - \theta\right) \cdot I_{IN} + \left(1 - \frac{\varepsilon}{2}\right) \cdot \cos\left(\frac{\Delta\phi}{2} - \theta\right) \cdot Q_{IN}.$$

Thus, in matrix form:

$$\begin{pmatrix} I_{OUT} \\ Q_{OUT} \end{pmatrix} = \begin{pmatrix} \left(1 + \frac{\varepsilon}{2}\right) \cdot \cos\left(\frac{\Delta\phi}{2} + \theta\right) & \left(1 + \frac{\varepsilon}{2}\right) \cdot \sin\left(\frac{\Delta\phi}{2} + \theta\right) \\ \left(1 - \frac{\varepsilon}{2}\right) \cdot \sin\left(\frac{\Delta\phi}{2} - \theta\right) & \left(1 - \frac{\varepsilon}{2}\right) \cdot \cos\left(\frac{\Delta\phi}{2} - \theta\right) \end{pmatrix} \cdot \begin{pmatrix} I_{IN} \\ Q_{IN} \end{pmatrix}$$

$$\begin{pmatrix} I_{OUT} \\ Q_{OUT} \end{pmatrix} = \begin{pmatrix} K_{11} & K_{12} \\ K_{21} & K_{22} \end{pmatrix} \cdot \begin{pmatrix} I_{IN} \\ Q_{IN} \end{pmatrix}$$

$$\begin{pmatrix} I_{OUT} \\ Q_{OUT} \end{pmatrix} = K_{RX} \cdot \begin{pmatrix} I_{IN} \\ Q_{IN} \end{pmatrix}$$

where $K_{RX}$ is a distortion matrix defining a distortion of the receiver front end 32. Thus, in one embodiment, the baseband processor 38 may compensate for the I/Q mismatch of the receiver front end 32 using a correction matrix (H) defined as the inverse of the distortion matrix $K_{RX}$. In another embodiment, the baseband processor 38 computes the I/Q mismatch, namely the quadrature error $\Delta\phi$ and the gain error $\epsilon$, which may be used to compensate for the I/Q mismatch in either the receiver front end 32 or the baseband processor 38. The gain error $\epsilon$ and quadrature error $\Delta\phi$ measurements may also be used by designers to determine if predetermined design targets for the gain and quadrature error have been achieved.

Figure 3:
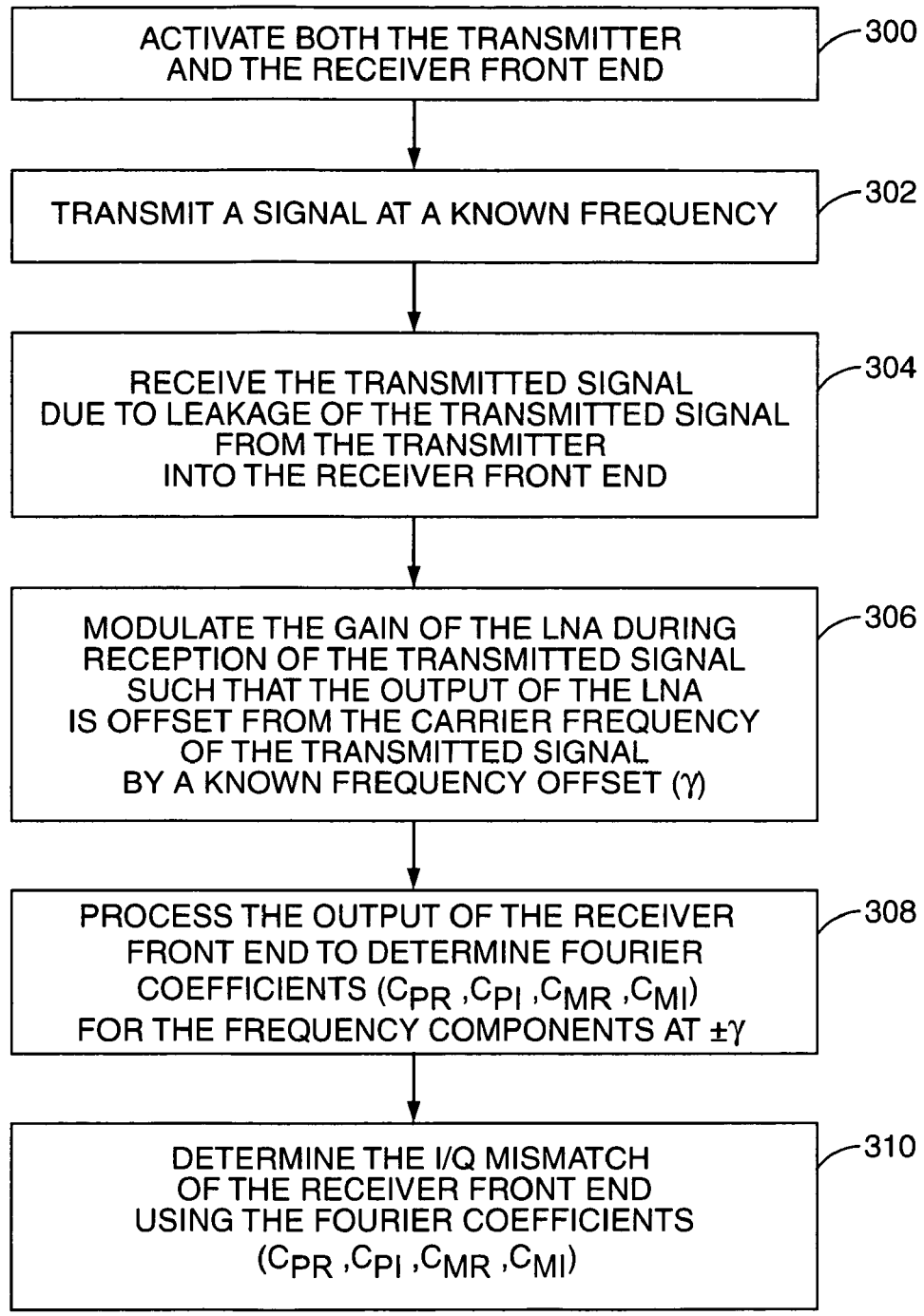
FIG. 3 illustrates a method for computing an I/Q mismatch of a receiver front end of a mobile terminal based on leakage of a radio frequency signal from a transmitter of the mobile terminal to the receiver front end according to one embodiment of the present invention.

FIG. 3 illustrates a method of determining the I/Q mismatch of the receiver front end 32 according to one embodiment of the present invention. Preferably, an I/Q mismatch of the radio frequency transmitter 34 has already been calibrated such that the output of the radio frequency transmitter 34 has essentially no, or very little, residual I/Q mismatch. The process begins by activating both the radio frequency transmitter 34 (FIG. 2) and the receiver front end 32 (FIG. 2) (step 300). Next, a single tone radio frequency signal that is offset from the carrier is transmitted by the radio frequency transmitter 34 (step 302). The single tone radio frequency signal that is offset from the carrier is hereafter referred to as a single offset tone. The single offset tone may be generated by driving the I-baseband input of the radio frequency transmitter 34 with cos(2*pi*3.333 MHz*t) and the Q-input with sin(2*pi*3.333 MHz*t). The frequency of 3.333 MHz is for illustration only but is subject to some restrictions as explained later. According to the present invention, the receiver front end 32 and the radio frequency transmitter 34 are formed on a single substrate. As such, the radio frequency signal transmitted by the radio frequency transmitter 34 is received by the receiver front end 32 due to leakage through the substrate (step 304).

Referring briefly back to FIG. 2, leakage occurs from the output of the power amplifier circuitry 62 to the input of the LNA 42, from the output of the power amplifier circuitry 62 to the input of the mixer 44, and from the output of the power amplifier circuitry 62 to the input of the mixer 46. The leakage from the output of the power amplifier circuitry 62 to the inputs of the mixers 44 and 46 is undesirable and corrupts measurements of I/Q mismatch. Thus, referring again to FIG. 3, a gain of the LNA 42 (FIG. 2) is modulated during reception of the transmitted signal such that a frequency of the amplified signal provided by the LNA 42 is offset from the carrier frequency of the transmitted signal by a known frequency offset ($\gamma$) (step 306). Note that in the preferred embodiment, the carrier frequency of the radio frequency transmitter 34 coincides with the frequency of the receiver LO signal ($I_{LO1}$, $Q_{LO1}$). The gain of the LNA 42 may be modulated by switching the gain of the LNA 42 between two values at a predetermined rate. For the 3.333 MHz signal selected for illustration, a suitable LNA modulation frequency is 1 MHz. This produces offset tones at 4.333 MHz and 2.333 MHz. Either of the new tones can be used. Let the choice be $\gamma$. As a result, the LNA 42 provides the amplified signal having a component at a frequency of $\omega_C + \gamma$. The known frequency offset ($\gamma$) is selected to be an odd frequency such as 3.333 MHz to keep square wave harmonics from mixing down to the desired output frequency.

The quadrature output signal ($I_{OUT}$, $Q_{OUT}$) provided by the receiver front end 32 is processed by the baseband processor 38 (FIG. 2) to determine Fourier coefficients ($C_{PR}$, $C_{PI}$, $C_{MR}$, $C_{MI}$) for frequency components of the quadrature output signal ($I_{OUT}$, $Q_{OUT}$) at $\pm\gamma$ (step 308). IQ mismatch generates the component at $-\gamma$. $C_{PR}$ and $C_{PI}$ are the real and imaginary coefficients of the $+\gamma$ component and $C_{MR}$ and $C_{MI}$ are the real and imaginary components of the $-\gamma$ component. Then, using a predetermined relationship between the Fourier coefficients ($C_{PR}$, $C_{PI}$, $C_{MR}$, $C_{MI}$) and the I/Q mismatch parameters, the quadrature error $\Delta\phi$ and the gain error $\epsilon$ are determined (step 310).

More specifically, if the output of the receiver front end 32 is defined as:

$$f(t) = I_{OUT} + i \cdot Q_{OUT},$$

then the Fourier series of f(t) is:

$$f(t) = \sum_{n=0}^{\infty} [(C_{PR,n} + i \cdot C_{PI,n}) \cdot e^{i \cdot n \cdot \omega_O \cdot t} + (C_{MR,n} + i \cdot C_{MI,n}) \cdot e^{-i \cdot n \cdot \omega_O \cdot t}],$$

where $C_{PR,n}$, $C_{PI,n}$, $C_{MR,n}$, $C_{MI,n}$ are the Fourier coefficients for the nth harmonic and $\omega_O$ is a fundamental frequency of the Fourier series. As will be apparent to one of ordinary skill in the art, the Fourier coefficients for the positive frequency component of a desired harmonic ($n_D$) may be computed by multiplying each side of the equation above by $e^{\hat{}}(-i \cdot n_D \cdot \omega_O \cdot t)$ and integrating over a period equal to $T_0$, which is a period of the fundamental frequency $\omega_O$. By doing so, an expression is obtained that can be solved using the quadrature output signal ($I_{OUT}$, $Q_{OUT}$) provided by the receiver front end 32 to compute the Fourier coefficients $C_{PR}$ and $C_{PI}$ for the desired harmonic ($n_D$). The fundamental frequency $\omega$ is selected to obtain the desired frequency resolution. For the negative frequency component of the desired harmonic ($n_D$), both sides of the equation above may be multiplied by $e^{\hat{}}(+i \cdot n_D \cdot \omega_O \cdot t)$ and integrated over a period equal to $T_0$. As a result, an expression is obtained that can be solved using the quadrature output signal ($I_{OUT}$, $Q_{OUT}$) provided by the receiver front end 32 to compute the Fourier coefficients $C_{MR}$ and $C_{MI}$ for the desired harmonic ($n_D$).

Thus, the baseband processor 38 processes the quadrature output signal ($I_{OUT}$, $Q_{OUT}$) provided by the receiver front end 32 during reception of the transmitted signal from the radio frequency transmitter 34 to solve for the Fourier coefficients $C_{PR}$, $C_{PI}$, $C_{MR}$, $C_{MI}$ for the harmonic of the Fourier series corresponding to $\pm\gamma$, where $\gamma$ is one of the frequency offsets created by modulating the gain of the LNA 42 in step 306.

The Fourier coefficients $C_{PR}$, $C_{PI}$, $C_{MR}$, $C_{MI}$ corresponding to the frequency offset $\pm\gamma$ are then used to compute the quadrature error $\Delta\phi$, the gain error $\epsilon$, and optionally the phase offset $\theta$ (step 310). More specifically, the gain error $\epsilon$ may be computed using the following equation:

$$\epsilon = 2 \cdot \frac{\sqrt{(C_{PR}+C_{MR})^2 + (-C_{PI}+C_{MI})^2} - \sqrt{(C_{PR}-C_{MR})^2 + (C_{PI}+C_{MI})^2}}{\sqrt{(C_{PR}+C_{MR})^2 + (-C_{PI}+C_{MI})^2} + \sqrt{(C_{PR}-C_{MR})^2 + (C_{PI}+C_{MI})^2}},$$

and the quadrature error $\Delta\phi$ may be computed using the following equation:

$$\Delta\phi = \mathrm{ArcTan}\left[\frac{-C_{PI}+C_{MI}}{C_{PR}+C_{MR}}\right] + \mathrm{ArcTan}\left[\frac{C_{PI}+C_{MI}}{C_{PR}-C_{MR}}\right].$$

The derivation of the equations for the gain error $\epsilon$ and the quadrature error $\Delta\phi$ will now be explained. As discussed above, the quadrature baseband signal ($I_{OUT}$, $Q_{OUT}$) may be defined in matrix form as:

$$\begin{pmatrix} I_{OUT} \\ Q_{OUT} \end{pmatrix} = \begin{pmatrix} (1+\frac{\epsilon}{2})\cdot\cos(\frac{\Delta\phi}{2}+\theta) & (1+\frac{\epsilon}{2})\cdot\sin(\frac{\Delta\phi}{2}+\theta) \\ (1-\frac{\epsilon}{2})\cdot\sin(\frac{\Delta\phi}{2}-\theta) & (1-\frac{\epsilon}{2})\cdot\cos(\frac{\Delta\phi}{2}-\theta) \end{pmatrix} \cdot \begin{pmatrix} I_{IN} \\ Q_{IN} \end{pmatrix}.$$

In order to relate the Fourier coefficients $C_{PR}$, $C_{PI}$, $C_{MR}$, $C_{MI}$ to the I/Q mismatch, the vector $I_{IN}$, $Q_{IN}$ is replaced by $\cos(\gamma \cdot t)$ and $\sin(\Gamma \cdot t)$ to obtain the following:

$$\begin{pmatrix} I_{OUT} \\ Q_{OUT} \end{pmatrix} = \begin{pmatrix} (1+\frac{\epsilon}{2})\cdot\cos(\frac{\Delta\phi}{2}+\theta) & (1+\frac{\epsilon}{2})\cdot\sin(\frac{\Delta\phi}{2}+\theta) \\ (1-\frac{\epsilon}{2})\cdot\sin(\frac{\Delta\phi}{2}-\theta) & (1-\frac{\epsilon}{2})\cdot\cos(\frac{\Delta\phi}{2}-\theta) \end{pmatrix} \cdot \begin{pmatrix} \cos(\gamma\cdot t) \\ \sin(\gamma\cdot t) \end{pmatrix}.$$

Then, substituting $$\frac{e^{i\cdot\gamma\cdot t} + e^{-i\cdot\gamma\cdot t}}{2} \text{ for } \cos(\gamma\cdot t), \text{ and}$$

$$\frac{e^{i\cdot\gamma\cdot t} - e^{-i\cdot\gamma\cdot t}}{2\cdot i} \text{ for } \sin(\gamma\cdot t),$$

the following equation is obtained:

$$\begin{pmatrix} I_{OUT} \\ Q_{OUT} \end{pmatrix} = \begin{pmatrix} (1+\frac{\epsilon}{2})\cdot\cos(\frac{\Delta\phi}{2}+\theta) & (1+\frac{\epsilon}{2})\cdot\sin(\frac{\Delta\phi}{2}+\theta) \\ (1-\frac{\epsilon}{2})\cdot\sin(\frac{\Delta\phi}{2}-\theta) & (1-\frac{\epsilon}{2})\cdot\cos(\frac{\Delta\phi}{2}-\theta) \end{pmatrix} \cdot \begin{pmatrix} \frac{1}{2}\cdot(e^{i\cdot\gamma\cdot t}+e^{-i\cdot\gamma\cdot t}) \\ -\frac{i}{2}\cdot(e^{i\cdot\gamma\cdot t}-e^{-i\cdot\gamma\cdot t}) \end{pmatrix}.$$

By expanding this equation, the coefficients of $e^{\wedge}(+i\cdot\gamma\cdot t)$ may be collected to provide the following expressions for $C_{PR}$ and $C_{PI}$:

$$C_{PR} = A\cdot\cos\left(\frac{\Delta\phi}{2}\right)\cdot\cos(\theta) - \frac{1}{2}\cdot A\cdot\epsilon\cdot\sin\left(\frac{\Delta\phi}{2}\right)\cdot\sin(\theta), \text{ and}$$

$$C_{PI} = -\frac{1}{2}\cdot A\cdot\epsilon\cdot\sin\left(\frac{\Delta\phi}{2}\right)\cdot\cos(\theta) - A\cdot\cos\left(\frac{\Delta\phi}{2}\right)\cdot\sin(\theta).$$

By collecting the coefficients of $e^{\wedge}(-i\cdot\gamma\cdot t)$, the following expressions for $C_{MR}$ and $C_{MI}$ may be provided:

$$C_{MR} = \frac{1}{2}\cdot A\cdot\epsilon\cdot\cos\left(\frac{\Delta\phi}{2}\right)\cdot\cos(\theta) - A\cdot\sin\left(\frac{\Delta\phi}{2}\right)\cdot\sin(\theta), \text{ and}$$

$$C_{MI} = A\cdot\sin\left(\frac{\Delta\phi}{2}\right)\cdot\cos(\theta) + \frac{1}{2}\cdot A\cdot\epsilon\cdot\cos\left(\frac{\Delta\phi}{2}\right)\cdot\sin(\theta).$$

Since the Fourier coefficients $C_{PR}$, $C_{PI}$, $C_{MR}$, $C_{MI}$ for the frequency offsets $\pm\gamma$ are determined by the baseband processor 38 in the manner described above, there are four equations and four unknowns ($\epsilon$, $\Delta\phi$, A, and $\theta$). Therefore, the equations for $C_{PR}$, $C_{PI}$, $C_{MR}$, $C_{MI}$ can be solved to compute $\epsilon$, $\Delta\phi$, A, and $\theta$. Thereafter, the values of $\epsilon$ and $\Delta\phi$ may be used to compute the distortion matrix $K_{RX}$ and/or the correction matrix H, which is the inverse of the distortion matrix $K_{RX}$. Using the distortion matrix $K_{RX}$ or the correction matrix H, the baseband processor 38 may post-distort the quadrature output signal ($I_{OUT}$, $Q_{OUT}$) during reception of subsequent signals in normal operation to compensate, or correct, the I/Q mismatch of the receiver front end 32. In addition, the phase offset $\theta$ is also corrected.

Those skilled in the art will recognize improvements and modifications to the preferred embodiments of the present invention. All such improvements and modifications are considered within the scope of the concepts disclosed herein and the claims that follow.

What is claimed is:
1. A method of compensating for an I/Q mismatch of a receiver comprising:
   providing receiver circuitry and associated transmitter circuitry formed on a single substrate;
   transmitting a transmit signal;
   receiving the transmit signal at an input of amplifier circuitry coupled to an input of the receiver circuitry due to leakage through the substrate from an output of the transmitter circuitry to the input of the amplifier circuitry;
   modulating a gain of the amplifier circuitry while receiving the transmit signal such that an output of the amplifier circuitry has a known frequency offset from a carrier frequency of the transmit signal;

downconverting the output of the amplifier circuitry using a quadrature local oscillator signal to provide a quadrature output signal; and processing the quadrature output signal to determine an I/Q mismatch of the receiver circuitry based on frequency components of the quadrature output signal corresponding to the known frequency offset.

2. The method of claim 1 wherein processing the quadrature output signal comprises determining Fourier coefficients for the frequency components of the quadrature output signal corresponding to the known frequency offset.

3. The method of claim 2 wherein downconverting the output of the amplifier circuitry comprises downconverting the output of the amplifier circuitry to a desired frequency to provide the quadrature output signal, and determining the Fourier coefficients comprises determining Fourier coefficients for a first frequency component corresponding to the desired frequency plus the known frequency offset and determining Fourier coefficients for a second frequency component corresponding to the desired frequency minus the known frequency offset.

4. The method of claim 3 wherein processing the quadrature output signal further comprises determining the I/Q mismatch of the receiver circuitry based on the Fourier coefficients.

5. The method of claim 4 wherein the I/Q mismatch comprises a gain error.

6. The method of claim 5 wherein determining the I/Q mismatch comprises determining the gain error based on the following equation:

$$\varepsilon = 2 \cdot \frac{\sqrt{(C_{Pr}+C_{Mr})^2+(-C_{Pi}+C_{Mi})^2} - \sqrt{(C_{Pr}-C_{Mr})^2+(C_{Pi}+C_{Mi})^2}}{\sqrt{(C_{Pr}+C_{Mr})^2+(-C_{Pi}+C_{Mi})^2} + \sqrt{(C_{Pr}-C_{Mr})^2+(C_{Pi}+C_{Mi})^2}},$$

where $C_{Pr}$ and $C_{Pi}$ are real and imaginary Fourier coefficients for the first frequency component of the quadrature output signal, and $C_{Mr}$ and $C_{Mi}$ are real and imaginary Fourier coefficients for the second frequency component of the quadrature output signal.

7. The method of claim 5 wherein the I/Q mismatch further comprises a quadrature error between in-phase and quadrature-phase components of the quadrature local oscillator signal.

8. The method of claim 7 wherein determining the I/Q mismatch further comprises determining the quadrature error based on the following equation:

$$\Delta\phi = \text{ArcTan}\left[\frac{-C_{Pi}+C_{Mi}}{C_{Pr}+C_{Mr}}\right] + \text{ArcTan}\left[\frac{C_{Pi}+C_{Mi}}{C_{Pr}-C_{Mr}}\right],$$

where $C_{Pr}$ and $C_{Pi}$ are real and imaginary Fourier coefficients for the first frequency component of the quadrature output signal, and $C_{Mr}$ and $C_{Mi}$ are real and imaginary Fourier coefficients for the second frequency component of the quadrature output signal.

9. The method of claim 7 wherein processing the quadrature output signal further comprises determining a phase offset between the carrier frequency and a frequency of the quadrature local oscillator signal based on the Fourier coefficients.

10. The method of claim 1 further comprising determining a distortion matrix defining a distortion of the receiver circuitry based on the I/Q mismatch.

11. The method of claim 1 further comprising providing a correction matrix for compensating for the I/Q mismatch of the receiver circuitry based on the I/Q mismatch.

12. The method of claim 1 further comprising post-distorting subsequent output signals from the receiver circuitry based on the I/Q mismatch, thereby compensating for the I/Q mismatch of the receiver circuitry.

13. The method of claim 1 further comprising activating both the receiver circuitry and the transmitter circuitry prior to transmitting the transmit signal.

14. A system for compensating for an I/Q mismatch of a receiver comprising:
a) receiver circuitry comprising:
  i) amplifier circuitry having a controllable gain; and
  ii) downconversion circuitry coupled to an output of the amplifier circuitry and adapted to downconvert an amplified signal from the amplifier circuitry using a quadrature local oscillator signal to provide a quadrature output signal;
b) transmitter circuitry, wherein the receiver circuitry and the transmitter circuitry are formed on a single substrate; and
c) processing circuitry adapted to:
  i) transmit a transmit signal via the transmitter circuitry such that the transmit signal is received at an input of amplifier circuitry forming an input of the receiver circuitry due to leakage through the substrate from an output of the transmitter circuitry to the input of the amplifier circuitry;
  ii) modulate the controllable gain of the amplifier circuitry while the receiver circuitry is receiving the transmit signal such that the amplified signal output by the amplifier circuitry has a known frequency offset from a carrier frequency of the transmit signal and the quadrature output signal includes frequency components corresponding to the known frequency offset; and
  iii) process the quadrature output signal to determine an I/Q mismatch of the receiver circuitry based on the frequency components of the quadrature output signal at the known frequency offset.

15. The system of claim 14 wherein the processing circuitry is further adapted to process the quadrature output signal to determine the I/Q mismatch of the receiver circuitry by determining Fourier coefficients for the frequency components of the quadrature output signal corresponding to the known frequency offset.

16. The system of claim 15 wherein the downconversion circuitry is further adapted to downconvert the amplified signal to a desired frequency to provide the quadrature output signal, and the processing circuitry is further adapted to determine the Fourier coefficients by determining Fourier coefficients for a first frequency component corresponding to the desired frequency plus the known frequency offset and determining Fourier coefficients for a second frequency component corresponding to the desired frequency minus the known frequency offset.

17. The system of claim 16 wherein the processing circuitry is further adapted to determine the I/Q mismatch of the receiver circuitry based on the Fourier coefficients.

18. The system of claim 14 wherein the processing circuitry is further adapted to determine a distortion matrix defining a distortion of the receiver circuitry based on the I/Q mismatch of the receiver circuitry.

19. The system of claim 14 wherein the processing circuitry is further adapted to provide a correction matrix based on the I/Q mismatch of the receiver circuitry.

20. The system of claim 14 wherein the processing circuitry is further adapted to post-distort subsequent output signals from the receiver circuitry based on the I/Q mismatch, thereby compensating for the I/Q mismatch of the receiver circuitry.

* * * * *